United States Patent Office 3,197,452
Patented July 27, 1965

3,197,452
METHOD FOR PREPARING PREVAILINGLY TO SUBSTANTIALLY ISOTACTIC CRUDE POLYMERIZATES OF BUTENE-1
Giulio Natta, Piero Pino, and Giorgio Mazzanti, all of Milan, Italy, assignors to Montecatini Societa Generale per l'Industria Mineraria e Chimica, a corporation of Italy
No Drawing. Original application Nov. 30, 1955, Ser. No. 550,164. Divided and this application Aug. 7, 1958, Ser. No. 753,625
3 Claims. (Cl. 260—93.7)

This is a division of pending application Serial No. 550,164, filed Nov. 30, 1955.

This invention relates to a new process for the selective polymerization of certain unsaturated hydrocarbons. More particularly, the invention relates to a process for producing, at will, polymers of unsaturated hydrocarbons which are predominantly to exclusively crystalline or predominantly to exclusively amorphous.

The unsaturated hydrocarbon polymerized has the formula $$CH_2=CHR$$

in which R is a saturated aliphatic, an alicyclic or an aromatic radical. The unsaturated hydrocarbons may be polymerized alone or in admixture with one another, or in mixtures with small amounts (1–15%) of another monomer copolymerizable therewith. In the formula given, R may be in specific modifications, an alkyl, cycloalkyl or aryl radical.

One object of this invention is to provide a new process for polymerizing the unsaturated hydrocarbons whereby it is possible to obtain, at will, polymers having a predetermined amorphous to crystalline ratio.

Another object is to provide an improved method for polymerizing the unsaturated hydrocarbons wherein the polymerization is carried out in the presence of and with the aid of a polymerization catalyst in a predetermined state of aggregation and predetermined state of dispersion such that the mechanism of the polymerization is influenced and polymers of predetermined amorphous to crystalline ratio are selectively produced.

In our pending applications Serial Nos. 514,097, now abandoned, 514,098 and 514,099, all filed on June 8, 1955, we have described new, regular, linear head-to-tail polymers of the unsaturated hydrocarbons as well as an improved method for producing the same.

The method described in said application Ser. No. 514,098 involves the use of polymerization initiators or catalysts as described in the Belgian Patent No. 533,362 for the polymerization of ethylene to polymers of high molecular weight.

Those catalysts are prepared by reacting a catalytic heavy metal compound and a catalytic metal alkyl compound together in the dissolved state.

The catalytic metal alkyl compound used in preparing the catalyst comprises a substance or mixture of substances consisting of simple and complex compounds the molecules of which contain as a central atom an element from the second and third columns of the Periodic Table, i.e., beryllium, magnesium, zinc, cadmium, and other elements of the second group, and aluminum and other elements of the third group.

The valences of the aforesaid central atom are linked to the same or different alkyl radicals such as ethyl, propyl, butyl, etc. One valence of the central atom may be satisfied by halogen or an alkoxy radical such as ethoxy.

The catalytic heavy metal compound used in the preparation of the catalyst consists of a compound or a mixture of compounds of a heavy metal of the 1st subgroup of groups IV to VI of the Periodic Table, including thorium and uranium, i.e., compounds of the elements of titanium, zirconium, hafnium, thorium, vanadium, tantalium, niobium, chromium, molybdenum, tungsten and uranium.

We have found, further, as set forth in our copending application Ser. No. 514,098, that the polymerization agents are particularly efficient when prepared in the presence of the free unsaturated hydrocarbon to be polymerized.

As disclosed in our said pending applications Serial Nos. 514,097, 514,098 and 514,099, of which the present application is a continuation-in-part, the polymers of the unsaturated hydrocarbons produced with the aid of the catalysts prepared as described above are, initially, mixtures of linear, head-to-tail polymers having substantially no branches longer than R. The mixtures comprise, mainly, amorphous and crystalline polymers in varying amounts.

Depending on their steric structure and molecular weight, these polymers exhibit very different characteristics. The amorphous polymers have viscous elastic properties which lie between those of a highly viscous liquid and those of an unvulcanized, non-crystallizable elastomer, while the solid, highly crystalline polymers, which can be oriented by drawing, are fiber-forming.

The polymers we obtain, which as pointed out in our copending applications supra are mixtures of linear, head-to-tail amorphous and crystalline polymers having no branches longer than R are unique in this art. That both types of polymers are linear is shown by their infra-red spectra. For example, in the case of our polypropylene, both the amorphous and crystalline polymers have similar infra-red spectra which are completely different from the infra-red spectra of the known branched polypropylene in which the branches are longer than R.

When monomer units some of which contain an asymmetric carbon atom having an $l$ configuration and some of which contain an asymmetric carbon having a $d$ configuration recur statistically along the polymer chain, as is the general case for all known vinyl polymers, the polymer may be considered as a copolymer of the two types of structural units. If the substituent R is much larger than an H atom, the polymer (or copolymer in the sense just explained) is substantially non-crystalline and does not have any 1st order transition temperature.

Prior to our invention and discovery as disclosed in our above-identified copending applications, the only known example of a vinyl polymer existing in both an amorphous and in a crystalline form were the polyvinyl ethers prepared by Schildknecht and co-workers (Ind. Eng. Chem., 40 (1948), 2104; ibid., 41 (1949), 1198, 2891). Those polyvinyl ethers are, of course, quite different from the polymeric products we have disclosed.

As we have shown in our applications Ser. Nos. 514,097 to 514,099, inclusive, and particularly in Ser. No. 514,099, those of our polymers which exhibit crystallinity are made up of macromolecules having a particular stereoregular structure in which, for at least long portions or sections of the main chain, the tertiary asymmetric carbon atoms of successive monomeric units have the same steric configuration, those macromolecules being made up of regularly repeating —$CH_2$— and —CHR— groups in long chains forming a regular pattern, shown more particularly in our pending application Ser. No. 514,099 as follows:

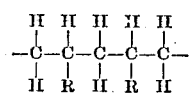

or as such in the model of a portion of such a macromolecule which is given in each of our said pending applications and which model is repeated hereinbelow.

When all the R groups of a plurality of chains show the above-mentioned regular arrangement, the polymers tend to adopt a crystalline structure. This is confirmed by examination with X-rays. We shall refer to the regular enchainment of the asymmetric carbon atoms in the main chain, which is a basic condition for crystallinity of our polymers, as "isotactic."

Our linear regular head-to-tail macromolecules having substantially no branches longer than R and the main chain of which has substantially a structure of the kind illustrated in the model below (isotactic structure):

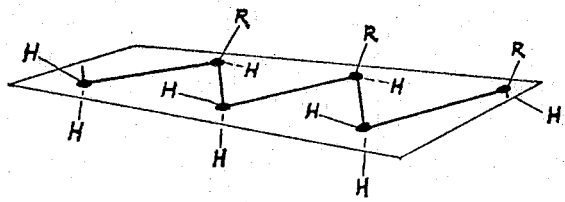

(Model of a portion of the main chain of a crystalline poly-alpha-olefin according to the present invention, arbitrarily fully extended in a plane in which model the R substituents on the tertiary C atoms are all above and their H atoms below the plane of the chain.)

are recognized in the art (following us) as "isotactic" macromolecules, whereas our macromolecules having substantially no branches longer than R and in which the asymmetric carbon atoms of the two possible steric configurations have a substantially random distribution along the main chain are recognized in the art (following us) as "linear, regular head-to-tail atactic" macromolecules.

We have adopted the new term "isotactic" for identifying the structure of the kind shown in the model, the macromolecules having substantially that kind of structure, and polymers consisting of these macromolecules substantailly having that kind of structure (see, for example, the Natta et al. communication to the editor of the Jr. of the Amer. Chem. Soc., published in said Journal on March 20, 1965, received for publication December 10, 1954; and the Natta article published in the Journal of Polymer Science, April 1955, vol. XIV, issue No. 82, pp. 143–154, received for publication on February 17, 1955).

The main chain, when in the crystalline state, assumes a coiled configuration, the spiral having a pitch corresponding to a definite number of monomer units, generally three. In such case, all bonds between the R groups and the main chain have the same angle of inclination relative to planes perpendicular to the axis the spiral.

On the other hand, whenever the polymerization leads to a random distribution of the orientation of the side chain in relation to the plane of the main chain, an amorphous product results.

If the side chains, i.e., the groups R, are of considerable length compared with the distance of the carbon atoms in the main chain from one another, and if they possess a great mobility, said chains will obstruct the arrangement of a plurality of chains to form a crystal. The melting point of the crystalline polymers of the linear alpha-olefines generally decreases by increasing length of the R groups. Polymers containing isotactic chains generally show, besides a tendency to crystallize, also greater density, higher softening or melting temperature and lower solubility, compared with the "non-isotactic" products of equal molecular weight.

If the arrangement of asymmetric carbon atoms is "isotactic" crystallinity of the polymers occurs already at relatively low molecular weights, e.g., from about 1000 upward.

Although we were able to produce the polymers comprising the mixtures of amorphous and crystalline polymers from the unsaturated hydrocarbons using the catalysts described above, no method was available for "steering" the polymerization so as to predetermine the ratio of the amorphous polymers to crystalline polymers contained in the polymerizate we obtained. Such "steering" is accomplished by the process of the present invention according to which we produce polymerizates of preselected character, and which consist prevailingly of the crystallizable polymers or which consist prevailingly of the amorphous polymers.

The present process is based on our discovery that the formation of the higher proportions of amorphous polymers, or the formation of higher proportions of crystalline polymers, depends in general on the following physical and chemical factors with respect to the catalyst.

The critical physical factors are:

(1) The state of aggregation of the the polymerization aid and of the heavy metal compound used in its preparation.

(2) The state of dispersion of the polymerization aid in the solvent in which the polymerization is performed.

The critical chemical factors are:

(1) The nature of the functional groups bound to the heavy metal contained in the polymerization aid.

(2) The nature of the alkyl group or gorups as well as the presence or absence of other elements, such as halogen or oxygen in the metal-alkyl component used for preparing the polymerization aid.

(3) The valency of the heavy metal atom in the heavy metal compound used for preparing the polymerization aid.

Other factors to be taken into consideration in the process of the invention for selectively polymerizing unsaturated hydrocarbons so as to control the course of the polymerization and "steer" the same to obtain either higher proportions of the crystalline polymers or higher proportions of the amorphous polymers will become apparent from the detailed discussion of the invention which follows.

According to a main feature of our invention, polymerizates consisting substantially wholly of the crystalline polymer of the unsaturated hydrocarbons are obtained by using, for the preparation of the polymerization aid, a solid, crystalline heavy metal compound in which the heavy atoms have a valence lower than the maximum valence which the heavy metal should possess in accordance with the Periodic Table.

The heavy metal compound must be capable of reacting, at least on the surface, with the metal-alkyl. However, when preparing a catalyst for use as aid in the production of isotactical polymers, this reaction should not lead to the destruction of the crystal lattice originally existing in the heavy metal compound.

On the other hand, the proportion of amorphous polymers in the polymerization products increases if a heavy metal atom in the heavy metal compound is of maximum valence and increases further with increasing dimensions of the anionic groups contained in the heavy metal compound.

The chemical nature of these anionic groups has also a considerable influence. Heavy metal compounds which, by reacting with the metal-alkyl compounds, give amorphous products that are easily dispersible in the reaction medium result in catalysts which favor the production of polymers of the unsaturated hydrocarbons richer in non-isotactic products.

Polymerization aids which favor the production of isotactic polymers must contain, always, and however they are produced, a crystalline portion. (By "crystalline" portion is meant a portion which presents a regularity of structure resulting from the distribution of its atoms in a crystal lattice.) The best catalysts for the production of isotactic polymers are obtained, in fact, from a solid crystalline compound (e.g., $TiCl_2$ or $TiCl_3$)

which in reacting with the metallo-organic compounds does not undergo destruction of its crystal lattice.

The catalyst prepared, for example, from $TiCl_3$, which yields, preferentially, isotactic polymers, shows in fact the same violet color as $TiCl_3$ itself. The percentage of isotactic polymers in the resulting product is, in general, highest when the polymerization agent is prepared by starting with a pure, non-oxidized, non-hydrated $TiCl_3$ which is substantially free of $TiCl_4$.

On the other hand, when catalysts prepared from a liquid compound of a heavy metal in the stage of maximum valence (such as, for instance, $TiCl_4$), are used, there is obtained, even in the presence of a dispersing agent, a small portion of isotactic polymer in the resulting product. This can be explained by assuming that the black, solid precipitate consisting of a titanium compound of lower valence, which is formed in the reaction between $TiCl_4$ and metallo-organic compounds, possesses at least in part the regular structure of crystalline substances.

When compounds containing groups of various kinds bound to the Ti atom, such as the $Ti(OR)_nCl_{4-n}$ compounds, are reacted with metallo-organic compounds, the resulting polymerization agents are generally of less regular structure and, therefore, lead to predominantly non-isotactic polymers.

Considering, for example, a heavy metal compound wherein titanium represents the heavy metal, the following Table I will show that, starting with titanium dichloride as the lowest stage of valence and ending with compounds containing large anionic groups such as $(OH)_4$ or $(OR)_4$, a whole scale of heavy metal compounds is available which permits of the selection, at will, of a compound which, when used for preparing the polymerization agent, will yield a polymerizate containing predetermined proportions of the crystalline polymers and of the amorphous polymers.

TABLE I

| Type | Heavy metal compound state of aggregation at room temperature | Polymerization product, percent crystalline |
|---|---|---|
| $TiCl_2$ | Crystalline solid | 80–90 |
| $TiCl_3$ | ----do---- | 80–90 |
| $TiCl_4$ | Liquid | 40 |
| $TiCl_2(OR)_2$ | ----do---- | 35 |
| $TiCl(OR)_3$ | ----do---- | 10 |
| $Ti(OR)_4$ | ----do---- | Traces |
| $Ti(OH)_4$ | Amorphous solid | Traces |

When preparing the polymerization aid from a solid titanium compound such as powdery titanium trichloride, suspended in, e.g., a hydrocarbon, adding thereto a metal alkyl compound such as triethyl aluminum or diethyl aluminum monochloride, and subsequently heating the suspension to 50–90° C., a catalyst is obtained which permits control of the polymerization of the unsaturated hydrocarbons so that substantially crystalline polymers are obtained.

Instead of titanium trichloride, other solid, crystalline compounds of low valency may be used. For instance, the corresponding compound of divalent titanium ($TiCl_2$), is equally suitable for the production of catalysts for use in making substantially crystalline polymers of the alpha-olefines.

Titanium tribromide, however, even though it is a crystalline solid, yields, as compared to titanium trichloride, a larger proportion of non-isotactic polymers. This is due to the fact that $TiBr_3$ is slightly soluble in the hydrocarbon solvent used, and therefore reacts with the metallo-organic compounds, at least in part, in a state of non-crystallinity, namely while being dissolved in the hydrocarbon.

Titanium tetrabromide behaves similarly to the tetrachloride, yielding a partially amorphous and partially crystalline polymer. The high melting point of $TiBr_4$ has practically no influence since under the reaction conditions it is completely soluble in the solvent used.

In a similar manner, the ratio of amorphous to crystalline portions in the resulting polymerization product can be influenced in favor of the crystalline polymer by using as the heavy metal compound another, preferably solid, crystalline compound containing the heavy metal atom in a stage of valency lower than the maximum valence which it should possess according to the Periodic Table, and wherein the heavy metal is zirconium, hafnium, thorium, vanadium, niobium, tantalum, chromium, molybdenum, tungsten and uranium. Such compounds are, for example, solid crystalline vanadium trichloride, zirconium trichloride and chromium trichloride.

On the other hand, predominantly or wholly amorphous polymers are obtained with catalysts prepared by using as the heavy metal compound substances such as vanadium oxytrichloride $VOCl_3$ or vanadium tetrachloride, wherein vanadium is penta- or tetravalent, respectively, zirconium tetrachloride, chromium oxydichloride $CrO_2Cl_2$, and the corresponding compounds of the other aforesaid heavy metals.

The method according to this invention of preparing the polymerization agents suitable for the production of substantially crystalline polymers from solid, heavy crystalline metal compounds wherein the heavy metal atom has a valence lower than the maximum one, offers several advantages compared with other methods of preparing such catalysts. For instance, in preparing the catalysts from the aforesaid heavy metal compounds, smaller quantities of metallo-alkyl compounds are required for activating the catalyst surface.

In general, it can be stated that if the heavy metal compound is soluble or partially soluble in the liquid medium in which the catalyst is prepared, the catalyst will tend to disperse readily in the polymerization medium and will favor the production of amorphous polymers of the unsaturated hydrocarbon, whereas if the heavy metal compound is crystalline and insoluble in the medium in which the catalyst is prepared, the catalyst will contain crystalline parts and will be difficulty dispersible in the polymerization medium and favor the production of crystalline polymers of the unsaturated hydrocarbon.

The medium in which the catalyst is prepared and the polymerization medium may be the same, i.e., the liquid monomeric unsaturated hydrocarbon to be polymerized, with or without admixture with a solvent for the metal alkyl compound which solvent does not enter into the polymerization reaction.

The following hypothesis of the mechanism of the reactions which, we believe, take place in the formation of the catalyst from the heavy metal compound and the metal alkyl component, and the subsequent polymerization of the unsaturated hydrocarbons with the aid of the resulting catalyst, is postulated as an explanation of the nature or "mechanism" of the process of our invention.

According to a preferred embodiment, the metal alkyl compound, such as aluminum triethyl, is dissolved in the unsaturated hydrocarbon to be polymerized and the heavy metal compound, such as solid, crystalline titanium trichloride, or liquid titanium tetrachloride, is then brought into contact with the metal alkyl component in the presence of the olefine. Depending on the heavy metal compound used, one of the following two reactions will take place:

(a) $TiCl_3 + AlR_3 \rightarrow TiCl_2R + AlR_2Cl$
(b) $TiCl_4 + 2AlR_3 \rightarrow TiCl_2R + 2AlR_2Cl + R$ From the reaction mechanism indicated, it can be seen readily that the consumption of metal alkyl in the second case, that is when using a heavy metal compound in which the heavy metal is of maximum valency, is twice that in the first case using directly a heavy metal compound in which the heavy metal is already in a reduced state of valency.

In practice, the consumption of metallo-organic compound is even less, because in the case of TiCl$_3$ the reaction is limited to the surface of the TiCl$_3$ crystals.

As a further advantage, when it is desired to produce substantially crystalline polymers, the preparation of the catalyst according to Equation a requires only one step, while in the preparation of the catalyst according to Equation b, the additional step of mechanical fractionation is required. By this step, the solid fraction of the catalyst is separated from the liquid or dissolved portion thereof and only the solid fraction is used if a polymerizate consisting substantially of isotactic crystalline macromolecules is to be obtained as shall be explained in detail hereinafter.

On the other hand, it was found that a mixture of the amorphous polymers and the crystalline polymers can be obtained from unsaturated hydrocarbons by using the unfractionated polymerization agents which are obtained by using a preferably soluble or liquid heavy metal compound, such as titanium tetrachloride, titanium tetrabromide, vanadium tetrachloride and the like.

If such heavy metal compounds are reacted with a metal alkyl component, a change of valence will take place in the heavy metal compound. In the case of titanium tetrachloride, this change of valence can be assumed to take place according to the following scheme:

(c) $TiCl_4 + AlR_3 \rightarrow TiCl_3R + AlR_2Cl$
(d) $TiCl_3R \rightarrow TiCl_3 + R$
(e) $TiCl_3 + AlR_3 \rightarrow TiCl_2R + AlR_2Cl$ Steps c and d are fast reactions in which a strong gas development takes place and which therefore do not permit the formation of TiCl$_3$ or lower reaction products in a well-crystallized form. The polymerization products obtained with such catalysts are, therefore, a mixture of the isotactic polymers and the non-isotactic polymers.

Those methods which prevent the formation of crystalline reaction products of the heavy metal compound and the metal-alkyl, yield catalysts which promote the formation of amorphous polymers.

The formation of amorphous polymerization products is also promoted by using, in the preparation of the catalyst, metal alkyl components in which the alkyl groups exhibit strongly lyophilic properties.

The presence of the latter groups in the final catalyst assists the formation of a colloidal dispersion of the latter in the solvent.

Lyophilic groups suitable for this purpose are, for instance, alkoxy radicals or alkyl groups having relatively long chains of carbon atoms, which can be introduced into the final catalyst by being previously bound either to the initial heavy metal compound or to the metal alkyl compound. Such groups should have more than four and preferably from six to sixteen carbon atoms.

In the following Tables 2 to 4, the results of a number of polymerization tests are compiled which show the influence of such lyophilic groups in the metal alkyl component of the catalyst on the proportion of crystalline and amorphous polymers in the final polymerizate.

All tests reported in the tables were performed under comparable conditions. The molar ratios between titanium tetrachloride and the aluminum alkyl compound were in the order of 1:2.5 to 1:10 and in the case of titanium trichloride to the aluminum alkyl compound of the order of 1:2.

It is apparent, from these tables, that the percentage of amorphous polymers in the final polymerization product increases with an increasing number of carbon atoms in the alkyl groups linked to aluminum, beginning with a number of 2C atoms in the alkyl radical.

With the solutions or high-degree dispersions obtained when lyophilic groups are present in the initial heavy metal compound or in the metal alkyl component, no precipitate can be isolated by mechanical steps such as filtration and the like.

As can be seen from Table 2, the formation of a non-crystalline catalyst and its dispersion are also favored by using heavy metal compounds having alkoxy substituent groups, even of relatively short chain length. For instance, dibutoxy titanium dichloride $Ti(OC_4H_9)_2Cl_2$ also leads to the formation of a catalyst which yields predominantly amorphous polymerizates of the unsaturated hydrocarbons.

TABLE 2

[Change of crystallinity with titanium substituent and substituent in metallo-organic compound polymerization of propylene. (Percentage of crystalline fraction in total polymer obtained)]

| Propylene | TiCl$_2$ | TiCl$_3$ | TiCl$_4$ | Ti(OC$_4$H$_9$)$_2$Cl$_2$ | Ti(OC$_4$H$_9$)$_3$Cl | Ti(OC$_4$H$_9$)$_4$ | Ti(OH)$_4$ |
|---|---|---|---|---|---|---|---|
| Al Ethyl$_3$ | (1) 75 | (2, 3, 4) 85 | (9) 47.8 | (14) 35.1 | (17) 10 | (16) Traces | (18) Traces |
| Al Propyl$_3$ | | (5) 77.5 | (10) 50.95 | | (17) Ti(OC$_3$H$^7$)$_4$ 4% | | |
| Al Butyl$_3$ | | (6) About 60 | (11) 30 | | | | |
| Al Hexyl$_3$ | | (7) 64 | (12) 26.2 | | | | |
| Al Hexadecyl$_3$ | | (8) 59 | (13) 16.2 | | | | |

The number in parentheses indicates the specific example given below from which the result shown was obtained.

Table 3 shows that the above mentioned rules for steering the polymerization process to obtain products of more or less predominantly crystalline character also prevail in in polymerization of the higher alpha-olefines, such as butene-1.

It can be seen from this table that the ratio of crystalline to amorphous solid polybutene-1 is greater when using TiCl$_3$ than when using TiCl$_4$ as one of the catalyst-forming components. The influence of the length of the alkyl radical in the aluminum alkyl compound is less pronounced than in the polymerization of propylene.

TABLE 3

[Change of crystallinity with titanium substituent and substituent in metallo-organic compound. Polymerization of butene-1 (percentage of crystalline fraction in total polymer obtained).]

| Butene-1 | TiCl₃ | TiCl₄ |
|---|---|---|
| Al Ethyl₃ | (19) 65 | (21, 21a) 46 / 51.5 |
| Al Propyl₃ | (19a) 75 | (22) 36.8 |
| Al Butyl₃ | (20) 67.7 | (23) 47.3 |
| Al Hexadecyl₃ | (20a) 55 | (24) 35.7 |

The number in parentheses indicates the specific example given below from which the result shown has been obtained.

Table 4, on the other hand, illustrates the influence of the presence of halogens as well as isoalkyl groups in the metal organic component on the composition of the final polymerization products. The presence of such halogen substituents in the metal organic component tends to increase the amorphous fraction of the final product, over that in the product obtained with the corresponding metal organic component containing only straight chain alkyl groups, while isomery does not change the ratio in the polymer.

TABLE 4

[Influence of chlorinated or ramified (branched) radical substituents in the metallo-alkyl compound on the degree of crystallinity of polymers of propylene. Polymerization agents obtained from titanium trichloride and titanium tetrachloride.]

| | TiCl₃ | TiCl₄ |
|---|---|---|
| Al Ethyl₃ | (2) 85 | (9) 47.8 |
| Al Ethyl₂Cl | (25, 25a) 68 / 63.4 | 22.6 |
| Al Butyl₃ | (6) 60 | (11) 30 |
| Al isobutyl₃ | (26) 60 | (28) 29.2 |

The number in parentheses indicates the specific example given below from which the result shown has been obtained.

As has been stated above, we have further discovered that the state of aggregation or the phase in which the finally obtained catalyst is brought into contact with the unsaturated hydrocarbon monomers to be polymerized is of considerable importance in controlling the formation of a polymerizate having a higher content of either the crystalline or of the amorphous components.

We assume that when these solid, crystalline catalysts (for instance those containing titanium as the heavy metal, obtained by reacting TiCl₃ with triethyl-aluminum) show, to a given extent, solid, regular surfaces close to reactive metal alkyl linkages, they are particularly adapted for acting as catalysts in the formation of polymers having an isotactic arrangement of the asymmetric carbon atoms in the main chains and correspondingly a crystalline nature.

If, on the other hand, the surface structure of the catalyst particles is iregular, as in a micellar dispersion in a liquid, such catalysts act as polymerization agents which yield non-isotactic and correspondingly amorphous polymerization products.

This is confirmed by a study of Table 5, which shows the influence of the halogen linked to the heavy metal in the heavy metal compound, when the heavy metal is in a lower as well as in the maximum state of valence. It is apparent from this table that in the case of bromide and iodide as the starting heavy metal component a change of valence from 4 to 3 does not result in increased crystallinity in the resulting polymer but that the state of dispersion of the polymerization agent in the reaction medium is the decisive factor. Thus the polymerization agent obtained with TiI₃ yields a lower content of crystalline polymer than TiI₄ because it is more finely dispersed in the reaction medium than the polymerizing agent obtained from the latter substance.

In the case of TiBr₃ the two factors, valence and state of dispersion, balance each other, so that the degree of crystallinity obtained in the final polymerization product is the same.

TABLE 5

[Influence of halogen in titanium halide on degree of crystallinity o propylene polymer. Polymerization agent obtained from aluminum triethyl and titanium trihalide or tetrahalide]

| Propylene | TiCl$_n$ | TiBr$_n$ | TiI$_n$ |
|---|---|---|---|
| Tri-Halide | (2) 85 | (30) 44 | (32) 10 |
| Tetra-Halide | (9) 47.8 / 39.4 | (31) 42 | (33) 46 |

The number in parentheses indicates the specific example given below from which the result shown has been obtained.

The influence exerted by the nature of the polymerization aid or catalyst in the polymerization of the unsaturated hydrocarbons or alpha-olefines can be explained in the following manner:

During the polymerization process, using a crystalline agent, the alkyl chain of the heavy metal-alkyl linkages grows by reaction with the monomeric olefine molecules by inserting the latter into the linkages between the heavy metal atoms and the alkyl groups present on the surfaces of the crystals so as to form a growing paraffinic molecule which, due to its saturated nature, is less strongly adsorbed to the crystal surfaces than the olefinic monomer. Successive molecules of the monomer are adsorbed on the crystal surfaces and can then insert themselves between the heavy metal-alkyl groups linkages. If the successive monomer molecules are all oriented in the same way, a polymerization product of very regular structure and, therefore, crystallizable, will be obtained. On the other hand, if the molecules of the monomer are not similarly oriented due to a lack of "orienting surface" on the catalyst, an amorphous, non-crystallizable polymerization product results.

We have made the further discovery that a titanium containing catalyst or a catalyst containing another heavy metal of the kind described, of maximum valence, prepared as described in our copending application Ser. No. 514,098 and comprising both coarse crystalline particles and finely dispersed to dissolved or liquid portions can be separated into several fractions one of which consists of the coarser, more crystalline particles which, when used as a catalyst in the polymerization of the unsaturated hydrocarbon, yields chiefly or exclusively isotactic and, therefore, crystallizable polymers, and the other of which comprises a micellar dispersion or finer, less crystalline particles which yield predominantly or exclusively amorphous, non-crystallizable polymeric products, i.e., polymers having mainly non-isotactic chains.

As described in said pending application Ser. No. 514,098, when the unfractionated catalyst is used, a mixture of amorphous and crystalline polymers is obtained. However, when the coarser, more crystalline particles are separated, for instance by filtering the catalyst containing medium through filter plates having relatively small pores, the filtrate containing the finer, more highly dispersed particles can be used as aid in the selective polymerization of the unsaturated hydrocarbons to substantially completely amorphous products. This separation is accomplished, for example, by the use of a porous glass plate filter having pores of 5 to 15 microns diameter. Catalyst particles of a size to be retained by a filter having pores of a diameter between 5 and 15 microns yield predominantly to exclusively crystalline polymers of the unsaturated hydrocarbon while those which pass through such pores yield predominantly to exclusively amorphous polymers.

As shown in Table 6 below, in the case of catalysts obtained from $TiCl_4$, the fraction remaining on the filter can be used as a catalyst for producing polymerizates of higher (54%) crystalline polymer content than is contained in polymerizates produced with the aid of the unfractionated catalyst. The latter polymerizates have a crystalline polymer content of only about 40%.

TABLE 6

[Amount of crystallinity in polyolefines obtained with precipitate and filtrate of catalyst prepared from heavy metal tetrahalide and aluminum triethyl]

| Polymerization Agent | $TiCl_4$ Propylene Polymers | $VCl_4$ Styrene Polymers |
|---|---|---|
| Precipitate | (50) 53.7 | (53) 68 |
| Filtrate | ¹ (51) | ¹ (54) |
| Unfractionated | (9) 47.8 | — |

¹ Completely amorphous.

If the precipitate on the filter is further fractionated by filtration through a filter having pores of a larger diameter (up to 50 microns), a precipitate is obtained on the filter which, when used as a catalyst in the polymerization of the unsaturated hydrocarbons, will yield polymers having a much higher content of crystalline product.

Other known separation methods, e.g., decantation, flotation or centrifuging may be used to separate the more crystalline (generally heavier) portions of the catalyst from the amorphous (generally lighter) portions thereof.

It will be apparent that the present invention provides methods for preparing various catalysts which can be used selectively for the production of substantially completely crystalline olefine polymers; mixtures having a predetermined content of crystalline to amorphous polymers; or substantially completely amorphous polymers of the unsaturated hydrocarbons.

Tables 7, 8 and 9 illustrate the various aspects of our invention as applied to various heavy metals of the groups described above, other than titanium. These tables confirm the influence of the various factors explained hereinabove, using heavy metal compounds other than titanium compounds.

TABLE 7

[Degree of crystallinity of propylene and butene-1 polymers obtained with various heavy metals of different valency, and with different metal alkyl compounds]

| | Propylene polymerization | | | | | Butene-1 polymerization $VCl_4$ |
|---|---|---|---|---|---|---|
| | $TiCl_4$ | $ZrCl_4$ | $VCl_4$ | $VOCl_3$ | $CrCl_3$ | |
| Al Ethyl₃ | (9) 47.8 | (40) 51.5 | (35) 48 | (36) 32.4 | (37) 36.4 | (44) 27.8 |
| Al Propyl₃ | (10) 50.95 | | (46) 41 | | | |
| Al Decyl₃ | | (45) 12 | | | (47) 10 | (48) 10 |
| Al Hexadecyl₃ | (13) 16.2 | | (29) 15 | | | |

TABLE 8

[Degree of crystallinity in propylene polymers obtained with polymerization agent prepared from heavy metal halides of different valences and aluminum triethyl]

| Propylene+Al Ethyl₃ | Ti | V | Cr | Zr | $MoCl_3/MoCl_5$ |
|---|---|---|---|---|---|
| III | (2) 85 | (34) 73 | (37) 36.4 | (39) 55 | |
| IV | (9) 47.8 | (35) 48 | | (40) 51.5 | (41) 50 |
| V | | (36) 32.4 | | | |
| VI | | | | (38) 21 | |

TABLE 9

[Degree of crystallinity in butene-1 polymers obtained with polymerization agent prepared from heavy metal halides of different valences and aluminum triethyl]

| Valence | Ti | V |
|---|---|---|
| III | (19) 65 | (43) 48.7 |
| IV | (21a) (21) 51.5 46 | (44) 27.8 |
| V | | (49a) $Al(C_6H_{13})_3$ 8.8 |

It may be noted that the use of alkyl-aluminum compounds containing alkyl groups of high molecular weight has a considerable influence in reducing the molecular weight of the polymer, when $TiCl_4$ is used. In that case, the alkyl groups of high molecular weight have an anti-coagulating effect on the catalyst which is formed. When solid $TiCl_3$ is used, the anti-coagulating effect is not exhibited.

The following examples illustrate in detail certain specific embodiments of the invention and explain the manner in which the above tables have been obtained, it being understood that these examples are not intended as restrictive of the scope of the invention.

Example I

Two steel balls, a glass vial containing 7.2 g. of crystalline titanium dichloride and a solution of 11.4 g. of triethyl aluminum in 500 cc. of n-heptane are introduced under nitrogen atmosphere into a 2150 cc. autoclave. The autoclave is then heated to 82° C. and at that temperature 140 g. of pure propylene are introduced. The autoclave is then set in motion in order to break the vial. This leads to the formation of a coarsely dispersed solid polymerizing agent. The autoclave is kept in motion for about 10 hours at 80 to 85° C. Thereafter, the gases are vented and the unpolymerized propylene is collected.

After pumping methanol into the autoclave, the polymer is taken out as a white powder and is purified with acids to eliminate the inorganic products present. About 115 g. of a white powder are obtained with conversion of 82% on the used propylene.

The polymer obtained is fractionated by hot extraction with solvents.

The oily, low molecular weight polymers, 5.8% of the obtained product, are removed by extraction with hot acetone. Extraction of the residue with hot ether dissolved an amount of polymer (8.3% of the total polymer) which consisted of solid polypropylene, amorphous under the X-rays, having an intrinsic viscosity of 0.47 in tetralin solution at 135° C.

By hot extraction with n-heptane a fraction was then obtained (corresponding to 10.4% of the total) consisting of polypropylene having an intrinsic viscosity of 0.57 and more than 50% crystalline under the X-rays. The extraction residue, corresponding to 75% of the total polymer, consists of a highly crystalline polypropylene having an intrinsic viscosity of 1.86. The raw polymer obtained had, therefore, a crystallinity of at least 80%.

*Example II*

A glass vial containing 2 g. $TiCl_3$ in 30 ml. n-heptane is introduced into a 435 ml. autoclave together with a steel ball (1 inch diameter) (to break the vial at the moment the polymerization is to be started). A solution of 5.7 g. triethylaluminum in 50 ml. n-heptane is then introduced into the autoclave under nitrogen atmosphere and the autoclave is heated up to 70° C. At this moment 103 g. of liquid propylene are admitted and soon afterwards the autoclave is put in motion in order to break the $TiCl_3$ vial.

A slight temperature increase is noticed, while the pressure decreases slowly but continuously. After 6 hours, during which the temperature is kept between 80 and 90° C. when a pressure decrease is no longer observed, 50 ml. methanol are pumped into the autoclave in order to decompose the catalyst, and the residual gases, containing 10 Nl of propylene, are released. From the autoclave a solid, compact mass is discharged, which is first purified as described in the foregoing example and then with concentrated HCl while swelling the mass with boiling toluene. The product is then coagulated with methanol, filtered and washed with methanol and dried by heating under vacuum.

82 g. of polymer are obtained, corresponding to a 79.6% conversion of the employed propylene. Said polymer is made up mostly (85%) of crystalline polypropylene, which may be separated from the non-crystalline products (15%) by extraction with solvents.

The amorphous portion is entirely soluble in acetone; the greatest portion soluble in warm ether has a softening point of 100° C., an intrinsic viscosity of 0.685 and a molecular weight of about 18,000. The crystalline portion, insoluble in warm heptane, has a softening point of 165° C., an intrinsic viscosity of 2.39 and a molecular weight about 120,000.

*Example III*

Into an oscillating 500 cm.³ autoclave, fitted with a jacket for circulation of heating oil provided with a control device for keeping the temperature constant within one degree, are introduced under nitrogen atmosphere 0.98 g. $TiCl_3$ in 220 cm.³ of anhydrous n-heptane. After evacuating, the solvent is saturated with pure propylene (98.5%) under a pressure of 1000 mm. Hg above the atmospheric pressure, bringing at the same time the temperature inside the autoclave to 70° C. The autoclave is kept in motion at 70° C. for 90 minutes. Under propylene pressure a solution of 1 cm.³ triethyl-aluminum in 30 cm.³ n-heptane is then added. This leads to the formation of a coarsely dispersed solid polymerization agent. For a period of 4 hours a continuous feed of gaseous propylene is then maintained, under a constant pressure of 1000 mm. Hg above atmospheric pressure.

After about 2 hours from the addition of triethyl-aluminum it can be noticed that the polymerization ratio corresponds approximately to an adsorption of 11.5 g. propylene per hour and per g. $TiCl_3$. After said period of time the product is taken out and purified as usual. In this way 42 g. propylene polymer are obtained, with a high content of crystalline product (about 80%).

*Example IV*

The autoclave of the preceding example is charged, in nitrogen atmosphere, with 1.05 g. $TiCl_3$ and with a solution of 3.25 g. triethyl aluminum in 250 cm.³ n-heptane. This leads to the formation of a coarsely dispersed polymerizing agent. The autoclave is then put in motion and kept for 4 hours at 70° C. The nitrogen is then replaced with propylene, saturating the solvent under a constant pressure of 1000 mm. Hg above atmospheric pressure. After two hours the polymerization rate corresponds to the adsorption of 11.4 g. propylene per hour and per g. $TiCl_3$. The amount and structure of the obtained polymer correspond to those obtained in Example III.

*Example V*

Into a 435 cm.³ oscillating autoclave are introduced two stainless steel balls and a vial containing 1.85 g. (0.012 mole) titanium trichloride; a solution of 3.9 g. tripropylaluminum in 100 cm.³ heptane is then added under nitrogen. The autoclave is heated to 73° C. and at this temperature 90 g. propylene are introduced. The autoclave is then set in motion so as to break the vial. This leads to the formation of a coarsely dispersed catalytic agent. After 10 hours' reaction at a temperature between 70 and 75° C., the reaction product is taken out. It appears as a solid very compact mass containing a large amount of adsorbed solvent. The purification is carried out by washing with diluted hydrochloric acid, as described previously. 72 g. of a solid white polypropylene are obtained, which are then fractionated by extraction with hot solvents.

The acetone extract corresponds to 3.5% of the obtained polymer and is formed by oily, low molecular weight products.

The ether extract corresponds to 13.3% of the total, and is formed of a solid amorphous polypropylene, showing an intrinsic viscosity of 0.725 (in tetralin at 135° C.) which corresponds to a molecular weight of about 20,000.

The heptane extract corresponds to 11.4% of the total and consists of a polypropylene having an intrinsic viscosity of 0.9, i.e., a molecular weight of about 28,000. Under the X-rays, this fraction appears to consist of polypropylene with a crystallinity higher than 50%.

The extraction residue is 71.8% of the total, and is formed of a highly crystalline polypropylene having an intrinsic viscosity of 3.08, i.e., a molecular weight of about 180,000. The raw polymer had therefore a total content of crystalline polypropylene of at least 77.5%.

*Example VI*

3.7 g. titanium trichloride and a solution of 9.9 g. tributylaluminum in 250 ml. heptane are introduced in a 2080 ml. autoclave. 220 g. of a propylenepropane mixture containing 92% propylene are added and the autoclave is heated, under stirring, to 90° C.

At this temperature a rapid pressure fall takes place. The autoclave is kept in motion for 5 hours; the polymerization product is then taken out and 190 g. polypropylene are obtained, which are fractionated by extra action with hot solvents, with the following results:

| | Percent of the total polymer | Intrinsic viscosity | Remarks |
|---|---|---|---|
| Acetone extract | 11 | | Amorphous low molecular weight polymers. |
| Ether extract | 20.4 | | Solid amorphous polymers. |
| n-Heptane extract | 17.1 | | 50% crystalline. |
| Extraction residue | 51.5 | | Highly crystalline. |

The obtained polymer had therefore a crystallinity of about 60%.

*Example VII*

A 435 cm.³ autoclave is charged with two steel balls, a vial containing 1.85 g. TiCl₃ and, in nitrogen atmosphere, a solution of 7.05 (0.025 moles) trihexyl-aluminum in 100 cm.³ heptane. After heating to 85° C., 92 g. propylene are added and the autoclave is set in motion. After keeping the temperature between 95° and 100° C. for about 10 hours, the reaction product is taken out and purified in the usual way.

83 g. of polypropylene are obtained, which are fractionated by extraction with hot solvents. The acetone extract corresponds to 11.8% of the total polymer and consists of oily products of low molecular weight. The ether extract is 15% of the total and consists of solid amorphous polypropylene, with an intrinsic viscosity of 0.57.

The heptane extract is 19.2% of the total and has an intrinsic viscosity of 0.8. This fraction, when examined under the X-rays shows a content of crystalline polymer higher than 50%. The extraction residue corresponds to 54% of the total and is formed by a highly crystalline polypropylene having an intrinsic viscosity of 2.07. The total product has therefore a content of crystalline polypropylene of about 64%.

*Example VIII*

A 1100 cm.³ autoclave is charged, under nitrogen atmosphere, with 1.85 g. TiCl₃ and with a solution in 100 cm.³ n-heptane of 17.5 g. of a trialkyl-aluminum having an average molecular weight corresponding to trihexadecyl-aluminum. The polymerizing agent occurs as a mixture of relatively coarsely dispersed and relatively finely dispersed particles. 130 g. of a propylene propane mixture containing 91% propylene are then added. The temperature is then brought to 90° C. and kept at this value for about 10 hours. The obtained product weighs after purification, 115.2 g., and is fractionated by extraction with hot solvents.

The acetone extract, 11.4% of the total polymer, is formed of oily, low molecular weight products.

The ether extract, 19.5% of the total, is a solid, amorphous polypropylene, showing in tetralin solution at 135° C. an intrinsic viscosity of 0.65.

The heptane extract 20% of the total, has a content of crystalline polypropylene higher than 50%. This fraction has an intrinsic viscosity of 0.80.

The extraction residue, 49.1% of the total, appears, under the X-rays, as a highly crystalline polypropylene, and has an intrinsic viscosity of 3.15. The total product has therefore a content of crystalline polypropylene of about 59%.

*Example IX*

About 600 ml. of solvent (heptane-isooctane mixture) containing 11.4 g. triethylaluminum are introduced into a 18/8 stainless steel autoclave of 2150 ml. capacity. 325 g. of propylene are added and the mixture is heated up to 60° C.; then 3.6 g. titanium tetrachloride dissolved in 50 ml. solvent are admitted into the autoclave. The temperature rises spontaneously in a few minutes up to 113° C. and then slowly decreases. When the temperature reaches 80° C., 1.8 g. titanium tetrachloride dissolved in 50 ml. gasoline are added. A further smaller temperature increase is then observed. The autoclave is kept in agitation for about two hours. It is cooled then to 60° C. and the residual gases are released.

The polymerizing agent is decomposed by introducing into the autoclave 150 g. of methanol. After stirring for a few minutes, the reaction product, consisting of a solid mass drenched with methanol and gasoline, is discharged. The product is slurried in ether and treated with hydrochloric acid to remove most of the inorganic substances, and is then coagulated with methanol and filtered. Thus 282 g. of a white solid product are obtained having a softening point of about 130–140° C. The yield of solid polypropylene on the introduced propylene is 87%; the yield on the converted propylene is higher than 95%.

The polymer obtained is fractionated by hot extraction with solvents, using, successively, acetone, diethyl ether and n-heptane.

The acetone extract corresponds to 40.5% of the polymer obtained and consists of a rubbery, amorphous solid. In tetralin solution at 135° C. it shows an intrinsic viscosity equal to 0.49 (corresponding to a molecular weight of 11,000).

The heptane extract corresponds to 24.4% of the polymer obtained and consists of a partially crystalline solid having an intrinsic viscosity equal to 0.95.

The residue which remains after said extractions amounts to 27.2% of the total polymer and consists of a powdery, highly crystalline solid having a first-order transition point of about 160° C. In tetralin solutions at 135° C. it shows an intrinsic viscosity equal to 1.77 (corresponding to a molecular weight of about 78,000).

*Example X*

530 ml. of gasoline containing 15.6 g. tripropyl aluminum and 275 g. propylene are introduced into a 2150 ml. autoclave, which is then heated up to 70° C. Thereafter, 3.6 g. titanium tetrachloride dissolved in gasoline are added. The temperature rises spontaneously to 95° C., then drops down again to 80° C. A further addition of 1.8 g. titanium tetrachloride is made. The autoclave is then kept in agitation for four hours while keeping the temperature at 80° C. By operating as in Example IX, 209 g. of solid polymer are obtained. The purified, unfractionated polymer begins to soften at 140°. The yield is 75% on the introduced propylene, and higher than 95% on the converted propylene.

The acetone extract corresponds to 7.1% of the polymer obtained and consists of oily, low molecular weight products.

The ether extract corresponds to 32.4% of the polymer obtained and consists of a rubbery, amorphous solid having an intrinsic viscosity of 0.9.

The heptane extract corresponds to 19.1% of the polymer obtained and consists of a partially crystalline solid having an intrinsic viscosity of 0.95.

The residue which remains after said extractions corresponds to 41.4% of the polymer obtained and consists of a powdery solid product which appears highly crystalline. When examined under the X-rays it has an intrinsic viscosity of 4.6 and becomes soft at about 180° C. The mechanical properties of samples obtained from such products are, due to the higher viscosity, better than those of samples obtained by the procedure described in Example IX.

*Example XI*

A solution of 10 g. Al (n-C₄H₉)₃ in 150 ml. n-heptane is introduced into a 100 ml. autoclave; 200 g. of a propylene-propane mixture, with 92% propylene, are then added. After heating the autoclave to 73° C. a solution of 3.8 g. TiCl₄ in 20 ml. n-heptane is injected.

The temperature rises spontaneously to 95° C., while the pressure falls rapidly. A finely dispersed polymerization catalyst is formed.

The autoclave is kept in motion for about 4 hours at temperatures between 80 and 90° C. Methanol is then pumped in the autoclave and, after purification in the usual way, 80 g. of solid, white, polypropylene are obtained, which is then fractionated by extraction with hot solvents.

The results of the fractionation are as follows:

|  | Percent of the total polymer | Intrinsic viscosity | Remarks |
|---|---|---|---|
| Acetone extract | 24.8 |  | Amorphous. |
| Ether extract | 36 | 0.47 | Solid amorphous. |
| n-Heptane extract | 18.3 | 0.71 | 50% crystalline. |
| Residue | 20.9 | 1.47 | Highly crystalline. |

The raw polymer had therefore a crystallinity of about 30%.

*Example XII*

A solution of 28.8 g. (1/10 of mole) of a trialkyl aluminum, having an average molecular weight corresponding to trihexylaluminum, is introduced into a 2150 ml. stainless steel autoclave, previously dried and evacuated. 28.5 g. of liquid propylene are admitted, then the autoclave is put in motion and the heating started. Once the temperature of 80° C. is attained, a solution of 3.8 g. TiCl₄ in 40 ml. heptane is introduced in the reaction vessel. The temperature goes up spontaneously reaching in a few minutes 120° C., and then drops slowly again. When the temperature is down again to 80° C., 3.8 g. more of TiCl₄, dissolved in 40 ml. heptane, are added. A further temperature increase occurs although smaller than the previous one. The autoclave is shaken for 2 more hours, the gaseous products are then vented and finally about 100 ml. methanol are introduced in order to decompose the polymerization agent. The residual gases derived from the decomposition of the catalyst are released; in the autoclave remains a viscous solid mass, which is discharged and purified by heating with ether and hydrochloric acid in order to remove the inorganic substances present on the filter, resulting from the decomposition of the catalyst. The polymer swollen by said solvents is then coagulated with methanol, filtered and washed with methanol. The solid mass left on the filter is then dried under reduced pressure at a temperature below 100° C.

25 g. of polymer are thus produced, corresponding to an 87% conversion of the employed propylene. 73.8% thereof is made up of an amorphous polymer, most of which, soluble in warm ether, shows the properties of an unvulcanized elastomer. The ether-soluble portion when extracted with warm acetone leaves an extraction residue having a softening point of 75° C., an intrinsic viscosity of 0.33 (determined in tetralin solutions at 135° C.) and a molecular weight of about 7,000.

The remaining 26.2% is formed of crystalline polypropylene, the bulk of which is insoluble in hot n-heptane, has a softening point of 150° C., and intrinsic viscosity of 1.28 and a molecular weight of about 50,000.

*Example XIII*

Proceeding as in Example XII, 70.2 g. of a trialkyl-aluminum having an average molecular weight corresponding to trihexadecylaluminum dissolved in 500 ml. heptane, and 350 g. liquid propylene are introduced into a 2150 ml. autoclave. The autoclave is heated up to 67° C. while keeping it in agitation; the solution of 3.8 g. titanium tetrachloride in 40 ml. heptane is then injected under nitrogen pressure. The temperature goes up spontaneously to 110° C.

Once the temperature is down again to 100° C. a solution of 3.8 g. titanium tetrachloride in 40 ml. heptane is injected. About 5 hours from the start of the polymerization 100 ml. methanol are pumped into the autoclave and the residual gases are vented.

Operating as in Example XII, the catalyst is decomposed and and after purification 338.7 g. of a solid polymer (corresponding to 96.5% of the employed propylene) are separated.

The raw product is made up mostly (83.8%) of amorphous polymer and only 16.2% is crystalline polypropylene, which may be separated from the remaining polymer by means of successive extractions with acetone, ether and n-heptane.

The amorphous portion, insoluble in acetone and soluble in ether, shows a softening point of 70° C., an intrinsic viscosity of 0.5 and a molecular weight of about 11,000. The crystalline portion, insoluble in n-heptane, has a softening temperature of about 150° C., an intrinsic viscosity of 1.03 and a molecular weight of about 37,000.

*Example XIV*

A sealed glass vial containing 9 g. dichlordibutoxy titanium (TiCl₂ (OC₄H₉)₂) and 3 steel balls are introduced into a 2150 ml. autoclave. Under nitrogen atmosphere the solution of 11.4 g. triethylaluminum in 500 ml. heptane is then syphoned in the autoclave. After heating up to 80° C., 275 g. of liquid propylene are then added and soon afterwards the autoclave is put in motion, keeping the temperature in the range 90–100° C. About 10 hours from the start of the polymerization, methanol is pumped into the autoclave and the unreacted gases are released. The reaction product extracted from the autoclave appears as a viscous, nearly solid, greenish brown colored mass, which is purified as usual.

After purification, 54.2 g. polymer are separated, corresponding to a 20% conversion of the employed propylene. More than half (64.9%) of the obtained product is made up of amorphous polypropylene, mostly soluble in warm ether.

The remainder (35.1%) is crystalline polypropylene, which may be separated from the amorphous portion by means of successive extractions with solvents.

*Example XV*

Into an autoclave of about 2 liter capacity are introduced under nitrogen a solution of 11.4 g. triethylaluminum in 500 cm.³ heptane and 190 g. propylene. The autoclave is heated to 64° C. and at this temperature a solution of 0.03 moles titanium tributylate monochloride in 50 cm.³ pentane is injected under nitrogen pressure. The autoclave is kept in motion for about 8 hours at a temperature between 80 and 85° C. After this time the reaction product is taken out; after purification and drying there are obtained 8 g. of a solid gummy polymer containing approximately 10% of crystalline polypropylene.

*Example XVI*

Example XV is repeated, using titanium tetrabutylate instead of the tributylate monochloride, 5.4 g. of low molecular weight polypropylene are obtained which contain only traces of crystalline polymer.

*Example XVII*

11.4 g. Al(C₂H₅)₃ dissolved in 200 ml. heptane and 200 g. propylene are introduced, under nitrogen, into a 2150 ml. autoclave. After heating under stirring to 81° C. a solution of 0.5 g. titanium tetraisopropylate is injected in the autoclave, which is then kept in motion for about 15 hours at temperature between 90 and 100° C. The reaction product is purified as usual, and 6 g. of polymer are obtained. These are fractioned by extraction with hot solvents in the usual way, and the following results are obtained:

| | Percent of the total polymer | Intrinsic viscosity | Remarks |
|---|---|---|---|
| Acetone extract | 60 | | Amorphous. |
| Ether extract | 33 | 0.87 | Solid amorphous. |
| n-Heptane extract | 6 | 0.71 | 50% crystalline. |
| Residue | 1 | | Highly crystalline. |

The obtained polymer had therefore a crystallinity of abuot 4%.

Example XVIII

A glass vial containing 0.7 g. Ti(OH)$_4$ and a solution of 5.7 g. Al(C$_2$H$_5$)$_3$ in 150 ml. n-heptane are introduced into a 435 ml. autoclave filled with nitrogen. 100 g. of a propylene-propane mixture containing 90% propylene are then added, the autoclave is heated to 90° C., and set in motion in order to break the vial. After 12 hours the polymerization product is taken out and the polymer is coagulated by adding methanol and acetone.

2 g. of solid polymer and 35 g. of semi-solid and oily, low molecular weight products are obtained.

The solid products when examined under the X-rays reveal a crystallinity of about 50%.

Example XIX

A glass vial containing 9.5 g. titanium trichloride is introduced together with 3 stainless steel balls, into a 2150 ml. autoclave. A solution of 11.4 g. triethylaluminum in 300 ml. heptane is then added under nitrogen atmosphere. The autoclave is heated to 70° C. and 202 g. butylene, prepared from butyl alcohol and containing 70% butylene-1 and 30% butylene-2 are introduced. The autoclave is kept in agitation at temperatures between 78–80° C. for 20 hours. Methanol is then pumped in and the unreacted gases are discharged.

From the autoclave a very viscous mass is discharged, which is entirely coagulated by further addition of methanol and purified as usual. 29 g. of white solid polymer are obtained, which are fractionated through extraction with hot solvents. 65% of the product is crystalline polybutylene of a molecular weight above 30,000.

The remainder is formed of wholly amorphous product showing the properties of an unvulcanized elastomer.

When the run is repeated employing as a catalyst a mixture of TiCl$_4$ and trihexadecylaluminum, a viscous product is obtained which is more fluid than the one of the preceding case, and formed in practice wholly by amorphous polybutene.

Example XIX-A 1.85 g. TiCl$_3$, a solution of 3.9 g. tripropylaluminum in 100 ml. heptane, and 85 g. 1-butene are introduced into a 435 ml. autoclave. The polymerization is carried out at temperatures between 90 and 95°. 60.5 g. polybutene are obtained, which are fractionated in the usual way.

The crystalline fraction, insoluble in hot ether, corresponds to 75% of the total product.

Example XX 6.5 g. TiCl$_3$ in a glass vial and two steel balls are introduced into an oscillating 1100 ml. autoclave. The autoclave is filled with nitrogen and a solution of 19.8 g. Al(n-C$_4$H$_9$)$_3$ in 500 ml. n-heptane is then added. After heating to 85° C., 115 g. butene-1 (Phillips pure grade) are added and the autoclave is put in motion so as to break the vial.

The temperature rises rapidly to 95° C. After keeping the autoclave in motion for 4 hours, the polymerization product is taken out and purified as usual. 109 g. white, solid, polybutene of fibrous appearance are obtained, which are fractioned by extraction with hot solvents. The fractions are as follows:

| | Percent of the total polymer | Intrinsic viscosity | Remarks |
|---|---|---|---|
| Acetone extract | 3.1 | | Low olly polymers. |
| Ether extract | 29.2 | 0.82 | Amorphous solid. |
| n-Heptane extract | 67.7 | 2.12 | Crystalline. |

Example XX-A 1.85 g. titanium trichloride and a solution in 100 ml. heptane of 17.5 g. of an alkylaluminum compound having an average molecular weight corresponding to trihexadecyl aluminum are introduced into a 435 ml. autoclave.

70 g. of 1-butene are added and the autoclave is then heated, under stirring, to 90° C., and kept at this temperature for 7 hours.

The polymerization product is then taken out and purified as usual.

61 g. of polybutene are obtained which are fractionated by extracting with hot solvents, with the following results:

| | Percent of the total polymer | Remarks |
|---|---|---|
| Acetone extract | 3 | Low molecular weight amorphous polymers. |
| Ether extract | 42 | Solid amorphous polymers. |
| Extraction residue | 55 | Highly crystalline polymers soluble in hot n-heptane. |

Example XXI 160 ml. of gasoline containing 5.7 g. of triethyl aluminum, and 85 g. of butene-1 (Phillips Petroleum Co. technical grade) are introduced into a 435 ml. autoclave. The autoclave is heated to 81° C. and 1.8 g. of titanium tetrachloride dissolved in 35 ml. of gasoline are then added. A spontaneous temperature increase of some degrees occurs.

After about one hour a further addition of titanium tetrachloride dissolved in gasoline is made; a spontaneous temperature increase of about 10° C. occurs. The autoclave is kept in agitation for some hours at a temperature of 90–98° C.

Operating as in the foreging examples, 10 g. of a white solid product are obtained, which softens at 110° C. and appears crystalline under the X-rays. The residue of the extraction with ether corresponds to 46% of the obtained polymer and shows an intrinsic viscosity, calculated from measurements similar to those described in Example IX, of 1.44 ml./g.

Example XXI-A 400 ml. of gasoline containing 11.4 g. of triethyl aluminum, and 291 g. of a butene-2-butene-1 mixture (with 70% of butene-1) are introduced into a 2150 ml. autoclave. The autoclave is then heated to 71° C. and 3.6 g. of titanium tetrachloride dissolved in gasoline are added; the temperature rises to 77° C. After two hours, a further addition of 3.6 g. of titanium tetrachloride is made. The autoclave is kept in agitation for some hours at a temperature in the range of 80–85° C. Operating as in the foregoing examples, 86 g. of white solid product are obtained. Said product shows characteristics similar to those described in Example XXI. Fibers are readily obtained from this product (the polymer mixture) by extrusion in a spinneret under nitrogen pressure at temperatures close to the softening point. They show a mechanical strength of the same order as the fibers obtained from ploypropylene, but a higher elasticity.

The polymer mixture was fractionated, as in preceding examples, using hot solvents.

The acetone extract amounting to 14% of the total polymer, consists of oily, low molecular weight products.

The ether extract, which amounts to 35.5% of the total polymer obtained consists of a rubbery, amorphous solid having an intrinsic viscosity of 0.35, corresponding to a molecular weight of about 7,000.

The residue of the ether extraction is completely extractable with n-heptane, with heating, and consists of a highly crystalline solid having a melting point of 125° C. and an intrinsic viscosity of 1.02, corresponding to a molecular weight of about 33,000.

*Example XXII*

A solution of 8 g. tripropylaluminum in 90 ml. n-heptane and 47 g. butene-1 (Phillips pure grade) are introduced into a 435 ml. autoclave.

The autoclave is heated to 65° C. and a solution of 3.8 g. titanium tetrachloride in 30 ml. n-heptane is injected under nitrogen pressure. The temperature rises spontaneously to about 75° C. The autoclave is then kept in motion for about 5 hours, at temperatures between 75 and 85° C.

22 g. of a white, solid polybutene are obtained after purification in the usual way. It is fractionated by extraction with hot solvents, and the following results are obtained:

|  | Percent of the total polymer | Intrinsic viscosity | Remarks |
| --- | --- | --- | --- |
| Acetone extract | 20 |  | Low polymers. |
| Ether extract | 43.2 | 0.535 | Amorphous solid. |
| n-Heptane extract | 36.8 | 1.07 | Highly crystalline. |

*Example XXIII*

A solution of 19.8 g. Al(n-C$_4$H$_9$)$_3$ in 450 ml. n-heptane is introduced into a 1100 ml autoclave filled with nitrogen. After adding 80 g. butene-1 (Phillips pure grade) the autoclave is heated to 85° C. and at this point a solution of 7.6 g. TiCl$_4$ in 50 ml. n-heptane is injected. The temperature goes up rapidly by about 10° while the pressure falls. The autoclave is then kept in motion for about 4 hours at temperatures between 85 and 95° C.

After purification in the usual way the polymerization product yields 44.2 g. polybutene, which are fractionated by extraction with hot solvents, with the following results:

|  | Percent of the total polymer | Intrinsic viscosity | Remarks |
| --- | --- | --- | --- |
| Acetone extract | 12.4 |  |  |
| Ether extract | 40.3 | 0.28 | Solid, amorphous. |
| Residue | 47.3 | 0.98 | Highly crystalline completely soluble in n-heptane. |

*Example XXIV*

17.5 g. of trihexadecylaluminum dissolved in 70 ml. heptane, and 80 g. 1-butene are introduced into an evacuated 435 ml. autoclave. After heating to 87° C. a solution of 2.3 g. TiCl$_4$ in 30 ml. heptane is injected.

The autoclave is kept in motion for about 6 hours and, proceeding in the usual way, 60.5 g. polybutene are obtained, which are fractionated by extraction with hot solvents, with the following results:

|  | Percent of the total polymer | Remarks |
| --- | --- | --- |
| Acetone extract | 15.6 | Low molecular weight amorphous polymers. |
| Ether extract | 48.6 | Solid amorphous polymers. |
| n-Heptane extract | 35.7 | Highly crystalline polymers. |

*Example XXV*

A glass vial containing 8 g. titanium trichloride and 3 steel balls are introduced in a 2150 ml. autoclave. A solution of 12 g. diethylaluminum monochloride in 500 ml. n-heptane is then introduced under nitrogen. After heating to 76° C. 365 g. of technical propylene (85% propylene) are added.

Soon afterwards the autoclave is shaken to cause the breaking of the TiCl$_3$ vial. Agitation is continued, at temperatures in the range 80–90° C. When a temperature decrease is no longer observed the gases are released and (while operating as in Example XXIV) 235 g. of polymer are obtained, corresponding to a 75% conversion of the employed propylene. The obtained product is made up mostly (84%) of crystalline polypropylene, which can be separated from the non-crystalline products by extraction with solvents.

*Example XXV-A*

A glass vial containing 7 g. TiCl$_3$ and 3 stainless steel balls are introduied into a 2080 ml. stainless steel autoclave in nitrogen atmosphere. A solution of 1.6 g. (0.013 moles Al(C$_2$H$_5$)$_2$Cl in 500 ml. n-heptane is then added. After heating to 70° C., 350 g. propylene are injected into the autoclave which is set in motion, thereby breaking the glass vial. After 10 hours at temperatures between 80 and 85° C., during which a continuous pressure fall is observed, the residual gases are vented and 10 Nl propylene are recovered. The solid polymer obtained weighs, after purification in the usual way, 315 g.

The extract with hot acetone is 10.8% of the total polymer. The ether extract, 16.2% of the total, is an amorphous, solid polypropylene, with intrinsic viscosity=0.43.

The n-heptane extract, 9.5% of the total, has an intrinsic viscosity of 0.955, and has a crystallinity, as detected by X-rays measurements, higher than 50%. The extraction residue, 63.4% of the total polymer, is a high crystalline polypropylene, with an intrinsic viscosity of 2.05.

*Example XXVI*

Into an oscillating autoclave of 1100 cm.$^3$ capacity are introduced two steel balls and a glass vial containing 1.85 g. TiCl$_3$. Under nitrogen atmosphere a solution of 4.95 g. triisobutyl-aluminum in 100 cm.$^3$ heptane is then added. The autoclave is heated to 85° C.; at this temperature 100 g. propylene are introduced and the autoclave is set in motion immediately thereafter. After about 10 hours at temperatures between 70 and 75° C., during which a considerable pressure decrease is noticed, the product is taken out and treated as usual.

63.6 g. polypropylene are obtained, which are fractionated by extraction with hot solvents. The acetone extract corresponds to 5.1% of the total. The ether extract corresponds to 27.4% and consists of a solid, amorphous polypropylene, with an intrinsic viscosity of 0.895. The heptane extract corresponds to 14.9% of the total, contains more than 50% crystalline polypropylene, and shows, in tetralin solution at 135° C., an intrinsic viscosity of 1.17. The residue is 52.6% of the total and consists of a highly crystalline polypropylene having an intrinsic viscosity of 2.56. The obtained product has therefore a content of crystalline polypropylene of at least 60%.

*Example XXVII*

500 ml. of gasoline containing 12 g. diethyl aluminum monochloride, and 310 g. of propylene are introduced into a 2150 ml. autoclave, which is heated to 60° C. Two portions of, respectively, 3.6 and 1.8 g. TiCl$_4$, dissolved in gasoline, are then added. The reaction proceeds as described in the foregoing examples.

The reaction product consists of 248 g. of solid, white, polypropylene. The yield is 80% on the introduced propylene and about 95% on the converted propylene.

The acetone extract, consisting of oily products, corresponds to 15% of the polymer obtained.

The ether extract, consisting of a rubbery, amorphous solid, corresponds to 44% of the polymer obtained and has an intrinsic viscosity of 0.4.

The heptane extract corresponds to 16.4% of the polypropylene obtained and consists of a partially crystalline solid with intrinsic viscosity 0.78.

The residue which remains after said extractions corresponds to 14.4% of the product obtained, has an intrinsic viscosity 1.53 and appears highly crystalline when examined under the X-rays.

*Example XXVIII*

A solution of 19.8 g. Al $(i=C_4H_9)_3$ in 500 ml. n-heptane and 290 g. propylene are introduced into a 2150 ml. autoclave filled with nitrogen. After heating to 66° C., a solution of 7.6 g. TiCl$_4$ in 80 ml. n-heptane is injected. The temperature rises sharply to 95° C. After keeping the autoclave in motion for about 7 hours at this temperature, the product is taken out and purified as usual. 215 g. of solid polymer are obtained, which are fractionated by extraction with hot solvents.

The results of the fractionation are as follows:

|  | Percent of the total polymer | Intrinsic viscosity | Remarks |
| --- | --- | --- | --- |
| Acetone extract | 18.7 |  | Oily, low molecular weight polymers. |
| Ether extract | 43 | 0.41 | Amorphous solid. |
| n-Heptane extract | 19 | 0.76 | 50% crystalline. |
| Residue | 19.3 | 1.87 | Crystalline. |

The raw polymer had therefore a crystallinity of about 29%.

*Example XXIX*

Example XII is duplicated, with the exception that a 435 ml. autoclave is employed, wherein 20 g. (1/20 mole) of a dialkylaluminum monochloride having an average molecular weight corresponding to didodecylaluminum monochloride, dissolved in 75 ml. anhydrous benzene, and 120 g. liquid propylene are introduced. The autoclave is heated up to 72° C., while agitating and then the solution of 1.9 g. titanium tetrachloride in 20 ml. heptane is injected under nitrogen pressure.

A spontaneous temperature increase of some degrees occurs. A solution of 1.9 g. titanium tetrachloride in 20 ml. gasoline is again injected. About 10 hours from the start, the catalyst is decomposed with methanol as in Example XII, and 68.5 g. of solid polymer are obtained, corresponding to a 57% conversion of the employed propylene. The polymer consists, practically in its entirety (more than 90%) of amorphous product.

The acetone insoluble and ether soluble portion of the amorphous polymer has a softening point of 55° C., an intrinsic viscosity of 0.25 and a molecular weight of about 5,000.

*Example XXX*

3.4 g. titanium tribromide and a solution of 2.85 g. triethylaluminum in 100 ml. n-heptane are introduced into a 435 ml. autoclave. 115 g. of a propylene-propane mixture, with 91% propylene, are then added. The autoclave is heated to 80–90° C. and kept in motion for about 10 hours.

The polymerization product is purified as in the previous examples and gives 102 g. of a solid polymer, which is fractionated by extraction with hot solvents.

The acetone extract, 10% of the total, consists of oily, low molecular weight polymers. The ether extract, 36% of the total, is a solid, amorphous polypropylene.

The n-heptane extract, 20% of the total, has a crystallinity, as detected by X-rays measurement, higher than 50%.

The extraction residue, 34% of the total, is a highly crystalline polypropylene.

The obtained polymer had therefore a crystallinity of at least 44%.

*Example XXXI*

Two steel balls, a glass vial containing 13 g. of titanium tetrabromide and a solution of 11.4 g. of triethyl aluminum in 500 ml. of n-heptane are introduced under nitrogen into an autoclave of 1750 ml. capacity. The autoclave is heated, keeping it motionless, up to 63° C. and at this point 280 g. of propylene are introduced into the equipment. Soon afterwards the autoclave is put in motion, causing in this way the breaking of the vial. The temperature rises now spontaneously in a short lapse of time up to 97° C. and drops then again down to 85° C. The autoclave is kept in agitation at this temperature for about ten hours. The unreacted gases are vented and methanol is pumped into the autoclave.

The polypropylene is then purified in the usual manner; 249 g. of polymer are obtained, equal to a conversion of 89% of the monomer employed.

The acetone extract corresponds to 15.1% of the polymer obtained and consists of oily products.

The ether extract corresponds to 33% of the polymer obtained and consists of a rubbery, amorphous solid with intrinsic viscosity 0.53.

The heptane extract corresponds to 22.1% of the polymer obtained and consists of a partially crystalline solid having an intrinsic viscosity equal to 0.65.

The residue which remains after said extractions corresponds to 30.8% of the polymer obtained and consists of a highly crystalline solid having, in tetralin solutions at 135° C., an intrinsic viscosity equal to 1.78.

*Example XXXII*

5.15 g. TiI$_3$ and solution of 2.85 g. Al(C$_2$H$_5$)$_3$ in 100 ml. heptane are filled into a 435 ml. autoclave.

130 g. of a propylene-propane mixture, containing 91% propylene, are then added, the autoclave is heated to 85–90° C. and kept in motion for about 20 hours.

The polymerization product appears as a semi-solid, tacky mass, which is purified and coagulated with methanol, 30 g. of solid, white polypropylene are thus obtained, while the evaporation of the solvent used in the polymerization and purification steps yields 54.3 g. oily, low molecular weight products.

Of the total 84.3 g. of product 64.5% is thus formed of oily products.

The solid polymer is fractionated by extraction with hot solvents. The amount of crystalline polypropylene thereby obtained is 10% of the total polymer.

*Example XXXIII*

Two steel balls, a glass vial containing 17 g. of titanium tetraiodide, and a solution of 11.4 g. of triethyl aluminum in 500 ml. of heptane are introduced into an autoclave of 2080 ml. capacity.

The autoclave is heated to 71° C. and at this temperature 268 g. of propylene are introduced and soon afterwards the autoclave is put in motion, causing in this way the breaking of the vial. The temperature rises spontaneously in a short lapse of time up to 100° C. and then drops again down to 90° C. The autoclave is kept in motion for about 6 hours and then the unreacted gases are vented, proceeding afterwards as described in the foregoing examples.

184 g. of propylene polymer are thus obtained which are fractionated by extraction with hot solvents.

The acetone extract corresponds to 20.4% of the polypropylene obtained and consists of oily, low molecular weight products.

The ether extract corresponds to 22.7% of the polymer obtained and consists of an amorphous solid having, in tetralin solutions at 135° C., an intrinsic viscosity equal to 0.43.

The heptane extract corresponds to 22% of the polymer obtained and consists of partially crystalline solid with intrinsic viscosity 0.73.

The residue which remains after said extractions corresponds to 35% of the polymer obtained and consists of a powdery, highly crystalline solid having an intrinsic viscosity of 2.16.

Example XXXIV

Into a 435 ml. autoclave two steel balls (1 inch diameter) and a glass vial containing 3.2 g. (i.e., 0.02 moles) of solid vanadium trichloride are introduced. Then a solution of 5.7 g. triethyl aluminum in 100 ml. n-heptane is added under nitrogen. The autoclave is heated to 81° C. and 98 g. pure liquid propylene are introduced; thereafter shaking of the autoclave is started, and continued for about 10 hours at temperatures in the range 81 to 90° C., while a steady, regular pressure decrease may be noticed. After said time, 50 ml. methanol are pumped into the autoclave and 6 Nl of gas are collected. A solid, compact polymer is discharged from the autoclave. It is first broken up in small pieces and then treated with warm ether and hydrochloric acid, finally coagulated with methanol and filtered. Since warm ether does not appreciably swell the obtained polymer, a further purification of the polymer will be necessary, by treating it with warm benzene (whereby it will be entirely swollen) and hydrochloric acid.

The polymer is then coagulated with methanol and acetone, filtered, washed and dried by heating it under vacuum, to obtain 64 g. of solid white product. The obtained polymer is fractionated as in the preceding example.

The acetone extract is 12.6% of the obtained polymer and is formed of low molecular weight amorphous polymers.

The ether extract, 21.4% of the total, is formed of amorphous polypropylene with an intrinsic viscosity of 0.55. The heptane extract, 24.1% of the total, contains more than 50% crystalline polypropylene (at the X-rays examination). This fraction has an intrinsic viscosity of 0.85, i.e., a molecular weight of about 25,000.

The extraction residue is a highly crystalline polypropylene having an intrinsic viscosity of 1.78, corresponding to a molecular weight of about 80,000.

The raw polypropylene obtained had therefore a content of crystalline polymer of at least 54%.

Example XXXV

Into a 435 ml. stainless steel shaking autoclave are placed two steel balls (1 inch diameter) and a glass vial containing 4.3 g. (0.02 moles) VCl₄.

The autoclave is then closed and evacuated and a solution of 5.7 g. (0.05 mole) triethyl aluminum in 100 ml. n-heptane is then added under nitrogen pressure. The autoclave is then heated without shaking to 81° C., when 118 g. of pure liquid propylene are introduced. Thereafter the glass vial is broken by shaking the autoclave, which is kept in motion at temperatures varying from 81° to 83° C., while a regular pressure decrease (from 41 to 13 atm.) is noticed. When a pressure decrease is no longer observed, methanol is pumped in the autoclave in order to decompose the catalyst. The autoclave is then vented and 5 Nl of gas are collected. The reaction product appears as a solid, light green mass, drenched with heptane and methanol. In order to purify the polymer from the inorganic products, it is treated with ether and hydrochloric acid, then coagulated with methanol, filtered and washed with methanol. The obtained solid, white polymer is lastly dried by heating under reduced pressure. 77 g. of solid polymer are obtained, which corresponds to 65.2% of the used propylene. The obtained polymer is fractionated by extracting it in succession with hot acetone, ether and n-heptane.

The acetone extract, 10.1% of the total, consists of low molecular weight, oily polymers. The ether extract, 45.2% of the total, is a solid polypropylene, amorphous under the X-rays, with an intrinsic viscosity, in tetralin solution at 135° C., of 0.82, corresponding to a molecular weight of about 24,000. The heptane extract, 16.45% of the total, is a polypropylene having an intrinsic viscosity of 1.31, i.e., a molecular weight of about 50,000. This fraction is approximately 50% crystalline. The extraction residue is a highly crystalline polypropylene, with an intrinsic viscosity of 1.88. The raw polymer obtained has therefore a crystallinity of about 36%.

Example XXXVI

A solution of 11.40 g. triethyl-aluminum in 400 cc. n-heptane, and 350 g. of a mixture containing 82% propylene and 18% propane are introduced, under nitrogen into an autoclave of 2000 cc. capacity. The autoclave is heated under stirring to 80° C., and at this temperature a solution of 6.8 g. VOCl₃ in 100 cc. n-heptane is injected.

The temperature rises spontaneously to 87° C., while the pressure falls rapidly. After about 5 hours methanol is pumped into the autoclave, and the polymerization product is taken out. The product is then purified from the inorganic compounds present by heating with ether and hydrogen chloride and complete coagulation with methanol.

172.5 g. polypropylene are obtained, corresponding to 60% of the used propylene. The polymer is then fractionated by extraction with hot solvents.

The acetone extract, 29% of the obtained polymer, is an amorphous, low molecular weight polypropylene.

The ether extract, 29.4% of the total, is an amorphous polypropylene with an intrinsic viscosity of 0.52.

The heptane extract, having a crystallinity of about 50%, shows an intrinsic viscosity of 1.15.

The extraction residue appears under the X-rays as a highly crystalline polypropylene, and has an intrinsic viscosity of 2.1. The raw polymer obtained had therefore a crystallinity of approximately 32.4%.

Example XXXVII

Into a stainless steel shaking autoclave of 435 ml. capacity 2 stainless steel balls (1 inch diameter) and a vial containing 3.25 g. CrCl₃ (i.e., 0.02 mole) are introduced. Into the closed autoclave a solution of 5.7 g. (i.e., 0.05 mole) triethyl aluminum in 100 ml. n-heptane is added under nitrogen. The autoclave is then heated without shaking to 80° C. and 115 g. pure liquid propylene are introduced. Soon after, shaking is started and continued at temperatures in the range 80° to 110° C.

Forty hours from the start the unreacted propylene is discharged. The reaction product is purified from the catalyst by washing with methanol and hydrochloric acid, and the solvents evaporated.

The obtained polymer is extracted with ether, which dissolves 37% of it; the dissolved fraction is completely amorphous. In the following extraction with boiling heptane a fraction corresponding to 44% of the total is dissolved, which is 50% crystalline and shows an intrinsic viscosity of 0.42.

The extraction residue is highly crystalline and has an intrinsic viscosity of 0.765. The raw product contains, therefore, approximately 41% crystalline polypropylene.

Example XXXVIII 5.7 g. triethyl aluminum dissolved in 200 cc. heptane and 172 g. propylene are charged under nitrogen into a 1000 cc. autoclave. The autoclave is heated to 80° C. and at this temperature the solution of 0.75 g. chromium oxychloride in 50 cc. heptane is injected. After keeping the autoclave in motion for about 20 hours the product is taken out and only small amounts of a propylene polymer, containing about 21% of crystalline product, are isolated.

Example XXXIX

A glass vial containing 2.36 g. (0.012 mole) ZrCl$_3$, solution of 2.85 g. triethyl aluminum in 100 cc. n-heptane, and two steel balls are charged into a 435 cc. shaking autoclave under nitrogen atmosphere.

The autoclave is heated, while not in motion, to 73° C. and at this temperature 70 g. of a propylene-propane mixture containing 91% propylene are then added. The autoclave is set in motion immediately thereafter so as to break the vial. After a few hours at 80° C., 7.6 g. of polymer are obtained which are fractionated by extraction with hot solvents.

By extraction with hot ether about 30% of the total product, i.e., the amorphous polypropylene is dissolved. In the following extraction with heptane 10% of the product is dissolved, and is formed of a polypropylene containing more than 50% of crystalline polymer. The extraction residue is a highly crystalline polypropylene. The raw product contains therefore about 50% of crystalline polypropylene.

Example XL

Into a 435 ml. autoclave 2 steel balls and a vial containing 4.7 g. (i.e., 0.02 mole) of ZrCl$_4$ and 5.7 g. triethyl aluminum in 100 ml. n-heptane are introduced, then the autoclave is heated to 79° C. and 106 g. pure liquid propylene are admitted. Shaking of the autoclave is then started and continued at temperatures in the range 80° to 90° C., while a regular pressure decrease is noticed.

When a pressure decrease is no longer observed, methanol is pumped in and the autoclave is vented 15 Nl of gas being collected. A viscous mass is then discharged, which is purified by treating it as described in the foregoing examples.

72% of the purified product can be extracted with ether and appears completely amorphous when examined under the X-rays. In the following extraction with boiling heptane, a fraction is dissolved which corresponds to 13.8% of the total product. Under the X-rays, this fraction shows a content of crystalline polymer of about 50%; the intrinsic viscosity, in tetralin solution at 135° C., is 0.94. The extraction residue is highly crystalline polypropylene with an intrinsic viscosity of 2.0 (i.e., a molecular weight of about 95,000). The raw product had, therefore, a content of crystalline polypropylene of about 21%.

Example XLI

Into a 2150 cc. autoclave are introduced under nitrogen 10 g. of a mixture containing 50% MoCl$_3$ and 50% MoCl$_5$, and a solution of 11.4 g. of triethyl aluminum in 500 cc. n-heptane.

Thereafter 365 g. of propylene are added and the autoclave is heated to 100° C., and maintained at this temperature under stirring for about 20 hours. The unreacted propylene is then vented, and the reaction product is extracted from the autoclave and purified by treatment with methanol and hydrogen chloride.

After evaporation of the solvents 115.3 g. of polypropylene are obtained, which are fractionated by hot solvent extraction. The acetone extract corresponds to more than 90% of the total product and is formed of oily, low molecular weight products.

The residue after extraction with acetone is formed by approximately 50% of a polypropylene, which is non-crystallizable and which is extractable with ether, while the rest is a polypropylene which appears crystalline under the X-rays.

Example XLII

A glass vial containing 9 g. WCl$_6$, and two steel balls are introduced into a 2080 ml. oscillating autoclave. The autoclave is then filled with nitrogen and a solution of 11.4 g. Al(C$_2$H$_5$)$_3$ in 500 ml. n-heptane is added.

After heating to 70° C., 140 g. of a propylene-propane mixture containing 90% propylene is added and the autoclave is set in motion. After about 10 hours, at 90–95° C., the polymerization product is taken out. It appears as a liquid brown mass. After washing with acid and evaporation of the solvent, 38 g. of oily products and 0.5 g. of solid polymer are obtained. The solid product appears approximately 50% crystalline when examined under the X-rays.

Example XLIII

Into a 435 ml. autoclave two steel balls and a glass vial containing 3.2 g. of solid vanadium trichloride are introduced. Operating as in the foregoing examples 5.7 g. (i.e., 0.05 mole) triethyl aluminum dissolved in 100 ml. heptane are then added. The autoclave is then heated to 83° C., 110 g. of a mixture of 1-butene and 2-butene with 70% of 1-butene are introduced, and the autoclave is shaken to cause the breaking of the vial. After about 10 hours of shaking at temperatures in the range 86° to 96° C., the autoclave is discharged operating as in the foregoing examples.

42 g. of a solid, fibrous, white substance are obtained; 21.5 g. thereof (i.e., 51.3%) can be extracted with ether and appear substantially amorphous under the X-rays. The extraction residue, corresponding to 48.7% of the whole solid polymer, when examined with the X-rays appears highly crystalline, and shows an intrinsic viscosity of 1.1.

Example XLIV

A solution of 11.4 g. triethyl aluminum in 400 cc. heptane is introduced under nitrogen into an autoclave of about 2 liters capacity. 220 g. of a mixture of 1-butene and 2-butene containing 70% of the former are then added. The autoclave is heated to 75° C. and at this temperature a solution of 4.4 VCl$_4$ in 100 cc. pentane is added. The autoclave is kept in motion for about 10 hours at temperatures between 75 and 80° C.; the reaction product is then taken out and purified as usual, obtaining 90.2 g. polybutene which are fractionated by successive extraction with hot acetone and ethyl ether. The residue after the extraction with ether corresponds to 27.8% of the obtained polymer and is formed of polybutene which appears crystalline under the X-rays. This fraction has an intrinsic viscosity, in tetralin solution at 135° C., of 1.65.

Example XLV

Into a 2150 ml. autoclave 2 steel balls and a vial containing 9.5 g. (i.e., 0.044 mole) ZrCl$_4$ are introduced. The autoclave is then evacuated and a solution of 45 g. (i.e., 0.1 mole) of a trialkyl aluminum compound (of an average molecular weight corresponding to tridecyl aluminum) in 450 ml. anhydrous benzene is added. The autoclave is heated, without shaking, to 82° C. and 222 g. propylene are introduced. Soon after, shaking is started to cause breakage of the vial, and continued for 14 hours at temperatures in the range 82° to 118° C., while a steady pressure decrease is noticed. After said time 100 ml. methanol are pumped in and a reaction product very much swollen with benzene is discharged. The obtained product contains a large proportion of relatively low molecular weight polymers which are amorphous, whereas only 12% of the total is insoluble in ether.

Example XLVI 8 g. Al(C$_3$H$_7$)$_3$ dissolved in 200 ml. heptane and 200 g. of propylene-propane mixture containing 91% propylene are introduced into a 1100 ml. autoclave filled with nitrogen. After heating to 82° C., 3.85 g. VCl$_4$ dissolved in 50 ml. n-heptane are injected under nitrogen pressure. The temperature goes up rapidly to 100° C., while a fall of pressure can be noticed. The autoclave is kept in motion for about 5 hours at a temperature between 90° and 100° C.

The polymerization product is then taken out; it appears as a compact solid mass swollen by the solvent. The product is purified by washing with solvents acidified with hydrogen chloride and then completely coagulated with methanol. 150.8 g. of a solid, white polymer are obtained, which are fractionated by extraction with hot solvents. The results of the fractionation are as follows:

| | Percent of the total polymer | Intrinsic viscosity | Remarks |
|---|---|---|---|
| Acetone extract | 10 | | |
| Ether extract | 35.8 | 0.52 | |
| n-Heptane extract | 26.5 | 1.3 | 50% crystalline. |
| Residue | 27.7 | 2.58 | Crystalline mol. wt. about 140,000. |

The polymerization product contained therefore approximately 41% crystalline polymer.

Example XLVII

Two steel balls and a vial containing 3.3 g. (i.e., 0.02 mole) $CrCl_3$ are introduced into a 435 ml. autoclave and then, under nitrogen atmosphere, a solution of 22.5 g. of a trialkyl aluminum compound having an average molecular weight corresponding to tridecyl aluminum, in 80 ml. anhydrous benzene is added. The autoclave is heated without shaking to 89° C. and 100 g. propylene are then admitted. Soon after, shaking is started and maintained for 14 hours at temperatures in the range 89° to 105° C. The purification and separation of the polymer is then carried out as in the preceding examples. The polymer which is richer in products of a lower molecular weight, contains only 14% of products insoluble in ether, and extractable with hot heptane. When examined under the X-rays, this fraction appears approximately as 50% crystalline.

Example XLVIII

Into a 2350 ml. autoclave 2 steel balls and a vial containing 7.8 g. of liquid $VCl_4$ are introduced. The solution of 45 g. of a trialkyl aluminum (of an average molecular weight corresponding to aluminum tridecyl) in 500 ml. n-heptane is then added.

The autoclave is then heated to 87° C. and 260 g. of butene (containing about 70% of 1-butene) are added. Shaking of the autoclave is then started and continued for about 10 hours, while keeping the temperature near 87° C.

Operating as in the foregoing examples 113 g. of a 1-butene polymer are obtained which is found to be almost entirely amorphous. It contains in fact less than 10% of crystalline product.

Example XLIX

A solution of 17.5 g. $Al(C_{16}H_{33})_3$ in 200 ml. n-heptane is introduced into a 2080 ml. autoclave filled with nitrogen. 280 g. of a propylene-propane mixture containing 91% propylene are then added. After heating to 80° C., 2.2 g. $VOCl_3$ dissolved in 50 ml. heptane are injected under nitrogen pressure. The temperature rises sharply to 90° C., while the pressure falls. After keeping the autoclave in motion for about 5 hours, the product is taken out and purified as usual. By coagulation with a large amount of methanol, 90 g. of polypropylene are obtained, which are fractionated by extraction with hot solvents. The following fractions are obtained:

| | Percent of the total polymer | Intrinsic viscosity | Remarks |
|---|---|---|---|
| Acetone extract | 47.6 | | |
| Ether extract | 31.5 | | Amorphous solid. |
| n-Heptane extract | 11.8 | | 50% crystalline. |
| Residue | 9.1 | | Crystalline. |

The obtained polymer was therefore approximately 15% crystalline.

Example XLIX-A

A solution of 0.02 mole trihexyl-aluminum in 250 ml. heptane, and 80 g. 1-butene are introduced in a 1 liter autoclave filled with nitrogen. After heating the autoclave to 90° C., a solution of 1.38 g. (0.008 mole) $VOCl_3$ in 50 ml. heptane is injected under nitrogen pressure. The temperature rises spontaneously to 95° C. The autoclave is kept in motion for about 4 hours at this temperature; the reaction product is then taken out and the polymer isolated and purified in the usual way. 32.5 g. of polymer are obtained, which is prevalently amorphous; by extracting it with hot ether, 8.8% of it remains as a residue. This residue appears highly crystalline when examined under the X-rays.

Example L 7.6 g. of $TiCl_4$ dissolved in 20 ml. n-heptane are added to 11.4 g. triethyl aluminum dissolved in 50 ml. n-heptane, at 70° C., while stirring. The reaction mixture is then filtered under nitrogen atmosphere through a porous diaphragm G4 (diameter of the pores 5–15 microns) and the solid phase is washed on the filter with a total of 120 ml. of a heptane solution containing 2% of triethyl aluminum. The solid phase is then suspended in 100 ml. n-heptane and introduced, while stirring under nitrogen pressure, into a glass vial which is then sealed. The vial, together with 3 steel balls (1 inch diameter), and a solution of 11.4 g. triethylaluminum in 400 ml. n-heptane are then introduced into a 2150 ml. autoclave. The autoclave is heated to 80° C. and 295 g. liquid propylene are introduced, the autoclave being soon after put in motion, while the temperature is kept between 80 and 90° C. When a pressure decrease no longer occurs, methanol is pumped into the autoclave and the gaseous products are released.

The reaction product is extracted from the autoclave as a nearly entirely solid mass which is purified by the usual method and by treatment with boiling toluene and concentrated HCl. After precipitation with methanol and several washings with methanol, it is filtered and dried. 111 g. of polymer are thus obtained, which correspond to a 37.5% conversion of the employed propylene. More than half of the product (53.7%) is made up of crystalline polypropylene, which may be separated from the non-crystalline product by extraction with solvents.

Example LI 80 ml. of the solution obtained by filtering the catalyst used in the foregoing example are syphoned into a 310 ml. autoclave, under nitrogen pressure. The autoclave is heated up to 80° C., 76 g. liquid propylene are introduced and finally the autoclave is put in agitation. About 6 hours from the start of the polymerization, when a remarkable pressure decrease is no longer observed, methanol is pumped into the autoclave in order to decompose the catalyst, and the gaseous products are then vented. The reaction product extracted from the autoclave appears as a viscous, nearly colorless liquid. It is coagulated with methanol to obtain a solid, gummy product which is treated as usual for its purification. It appears wholly amorphous under the X-rays.

Example LII

To a solution of 11.4 g. triethyl aluminum in 70 ml. heptane is added a solution of 7.6 g. titanium tetrachloride in 20 ml. heptane, while stirring, at a temperature of 70° C.

A black precipitate is formed while gas is evolved. The precipitate is filtered off under nitrogen pressure on a porous diaphragm (pore diameter 5–15 microns) and repeatedly washed with heptane containing 2% of triethyl-aluminum.

The black precipitate is then suspended in 250 ml. heptane containing 11.4 g. triethylaluminum. The whole is syphoned under nitrogen atmosphere into a 1000 ml. three neck flask fitted with a stirrer. The flask is heated to 65° C. and 150 g. styrene are added. The mixture is kept in agitation during 2½ hours at a temperature in the range 70–75° C. The obtained mixture is then cooled and poured into methanol in order to decompose the catalyst. The inorganic products are then dissolved by treating with hydrochloric acid. The reaction mixture separates into two layers of which the upper is heptane containing in suspension, the flocky, easily filterable polymer.

The precipitate is filtered and purified by boiling with acetone containing some hydrogen chloride, filtering and repeated washing with acetone. During such operation no loss in weight is practically observed. The obtained product appears very crystalline under the X-rays and starts melting above 210° C.

*Example LIII*

7.3 g. vanadium tetrachloride dissolved in 20 ml. n-heptane are added at 70° C., while stirring, to 11.4 g. of triethyl aluminum dissolved in 70 ml. n-heptane. The reaction mixture, consisting of a liquid phase wherein a brown precipitate is in suspension, is filtered under nitrogen atmosphere through a porous diaphragm whose pores have a diameter of 5 to 15 microns. The solid phase is then washed three times on the filter with 30 ml. each time of a 1% solution of triethyl aluminum in n-heptane. The solid phase is then suspended in 250 ml. n-heptane, and, while stirring, it is syphoned under nitrogen atmosphere in a previously deaerated glass flask provided with stirrer, dropping funnel and refluxing cooler. In the flask kept under nitrogen atmosphere, 11.4 g. triethyl aluminum are then added. The temperature of the mixture is raised to 70° C. and 150 g. styrene are added while stirring. Agitation is maintained for 4 hours at temperatures between 70 and 75° C. The flask is then allowed to cool, the catalyst is decomposed with methanol and finally the reaction product is treated with hydrochloric acid. The liquid mass contains in suspension a solid, flocky polymer which is then separated by filtration.

The solid polymer is made up of two portions, one of which is soluble, the other insoluble, in acetone. The insoluble portion, corresponding to 68% of the whole solid, is found to be highly crystalline, whereas the acetone soluble portion is amorphous.

*Example LIV*

The filtered solution, described in the foregoing example on the preparation of the catalyst is introduced into a 1000 ml. flask under nitrogen. 100 ml. n-heptane are then added and the flask is heated to 80° C. Next 150 g. styrene are added while stirring. The agitation is continued for 4 hours at temperatures in the range 70° to 75° C. After cooling, the reaction product is treated with methanol and hydrogen chloride. Thus small amounts of styrene polymer (entirely amorphous) are separated from the methanol solution. It is shown thereby that while the little dispersed catalyst, which may be separated by filtration as indicated in the Example LIII, yields a prevailingly crystalline product, the dispersed portion (which passes through the filter) yields a wholly amorphous polymer.

*Example LV*

By using purified titanium trichloride, with aluminum triethyl or any of the other metallo-alkyl compounds, polymers of a higher crystallinity are obtained.

7 g. of TiCl$_3$, purified of the traces of titanium tetrachloride by repeated washing in nitrogen atmosphere with anhydrous n-heptane, are introduced in a 2080 ml. autoclave, 11.4 g., triethyl aluminum in 500 cc. n-heptane, and 310 g. pure propylene are added. The autoclave is heated to 80° C. and kept in motion for about 10 hours at this temperature.

The polymerization product is then taken out and purified as usual. 240 g. of polypropylene are obtained which are fractionated with hot solvents, with the following results:

| | Percent of the total | Percent crystalline |
|---|---|---|
| Acetone extract | 3.5 | |
| Ether extract | 3.4 | Amorphous. |
| n-Heptane extract | 4.0 | 50. |
| Extraction residue | 89.1 | Highly crystalline. |

The obtained polymer has therefore a crystallinity of about 91%.

*Example LVI*

A solution of 12.9 g. triphenyl-aluminum in 250 ml. anhydrous benzene and 235 g. of a propane-propylene mixture contining 91% propylene are introduced into a 2080 ml. autoclave filled with nitrogen.

After heating to 95° C., a solution of 3.8 g. titanium tetrachloride in 40 ml. benzene is injected in the autoclave. The temperature goes up spontaneously to 100° C., and the autoclave is kept in motion at this temperature for a few hours. The reaction product is then taken out and purified as usual; 159 g. polymer are isolated, which are fractionated by extraction with boiling solvents, with the following results:

| | Percent of the total | Intrinsic viscosity in tetralin at 135° C. | Remarks |
|---|---|---|---|
| Acetone extract | 6.15 | | Oily, low mol. wt. polymers. |
| Ether extract | 53.75 | 0.565 | Amorphous solid. |
| Heptane extract | 17.80 | 1.02 | Crystalline. |
| Extraction residue | 22.30 | 2.76 | Highly crystalline. |

The raw polymer had therefore a crystallinity, as determined by X-rays measurements, of about 31%. The infra-red spectra of laminae prepared from the ether extract and from the heptane extract indicate the presence in the polymer of monosubstituted phenyl groups.

In a preferred embodiment, the unsaturated hydrocarbon polymerized contains from 3 to 8 carbon atoms.

By "state of aggregation" as used herein, is meant the various states of matter commonly referred to as true solids (that is, crystalline), liquid and gaseous, i.e., states in which atoms, ions and/or molecules are aggregated to one another to form larger particles of matter. By "amorphous" we mean that state between true solid and true liquid in which matter shows no distinct crystal lattice but does not flow due to its high viscosity.

By "state of dispersion" as used herein, we mean the degree to which matter consisting of aggregates as aforesaid is divided up into particles of various sizes ranging from a monomolecular dispersion, as in a true solution, to a "coarse" dispersion by which we understand a dispersion of particles of a size above a few microns. Intermediate degrees of dispersion comprise matter divided into micelles as in colloidal solutions.

Correspondingly, by a "finely dispersed" state is meant a state wherein the dispersed particles have a size below a few microns, i.e., particles which are prevalently dispersed in the colloidal state or, in the extreme case, true solutions.

Inert solvents used for preparing the polymerization catalyst when the same is not prepared in the monomeric unsaturated hydrocarbon, and the conditions used, including the temperatures and pressures used, are the same as disclosed in our aforementioned copending applications.

The method of precipitating the polymer with methanol, and of solvent fractionation described in the examples are chiefly intended for establishing the total amount of amorphous and crystalline polymers.

In practice, in the production of commercial polymers, particularly of highly crystalline products, the high molecular weight polymer, spontaneously separated from the solvent, which will only retain the small amounts of oily polymers that may be present, may be simply washed with alcohols to eliminate the enclosed catalyst.

For all those uses where a specially high purity is not required as washing with a hydrocarbon solvent may be substituted for the alcohol washing.

After drying the product will be ready for use.

It will be apparent that various changes and modifications may be made in practicing the invention and, therefore, it is to be understood that the invention is not intended to be limited except as defined in the appended claims.

What is claimed is:

1. A process for polymerizing butene-1 with a catalyst prepared from (1) a solid, violet crystalline material comprising violet crystalline titanium trichloride and (2) a dialkyl aluminum monohalide in which the alkyl groups contain from 2 to 4 carbon atoms, which process comprises forming the catalyst by mixing (1) and (2) at a temperature up to 90 C. and in a liquid diluent substantially inert to the dialkyl aluminum monohalide, to obtain a catalyst in which none of the titanium is reduced below the trivalent state, and then polymerizing butene-1 with said catalyst at a temperature between 20° C. and 120° C. in a liquid diluent substantially inert to the dialkyl aluminum monohalide.

2. A process according to claim 1, characterized in that the catalyst is prepared from (1) a solid, violet crystalline material comprising violet crystalline titanium trichloride and (2) a dialkyl aluminum monochloride.

3. A process according to claim 1, characterized in that the catalyst is prepared from (1) a solid, violet crystalline material comprising violet crystalline titanium trichloride and (2) diethyl aluminum monochloride.

References Cited by the Examiner

UNITED STATES PATENTS

| | | | |
|---|---|---|---|
| 2,721,189 | 10/55 | Anderson et al. | 260—93.7 |
| 2,825,721 | 3/58 | Hogan et al. | 260—93.7 |
| 2,858,902 | 11/58 | Cottle | 260—93.7 |
| 2,862,917 | 12/58 | Anderson et al. | 260—94.9 |
| 2,905,645 | 9/59 | Anderson et al. | 260—94.9 |

JOSEPH L. SCHOFER, *Primary Examiner.*

B. E. LANHAM, LESLIE H. GASTON, MILTON LIEBERMAN, WILLIAM H. SHORT, *Examiners.*

UNITED STATES PATENT OFFICE
CERTIFICATE OF CORRECTION

Patent No. 3,197,452                                July 27, 1965

Giulio Natta et al.

It is hereby certified that error appears in the above numbered patent requiring correction and that the said Letters Patent should read as corrected below.

Column 3, line 43, for "1965" read -- 1955 --; column 4, line 43, for "polymer" read -- polymers --; column 6, line 19, after "zirconium" strike out the comma; line 47, for "difficulty" read -- difficultly --; columns 7 and 8, TABLE 2, sixth column, line 1 thereof, for "(17)" read -- (15) --; column 9, line 67, for "iregular" read -- irregular --; column 11, TABLE 6, in the heading, line 2, for "alumin" read -- alumin- --; column 17, line 26, for "28.8" read -- 28.2 --; column 22, line 22, for "introduied" read -- introduced --; column 26, line 15, for "11.40" read -- 11.4 --.

Signed and sealed this 20th day of September 1966.

(SEAL)
Attest:

ERNEST W. SWIDER                                    EDWARD J. BRENNER
Attesting Officer                                    Commissioner of Patents